United States Patent
Noh et al.

(10) Patent No.: US 11,130,245 B2
(45) Date of Patent: Sep. 28, 2021

(54) PARALLEL INTEGRATED DRIVE MECHANISM

(71) Applicant: Ezwon Internet Service Co., Ltd., Gyeonggi-Do (KR)

(72) Inventors: Jae Ho Noh, Seoul (KR); Jae Yong Lee, Seoul (KR); Dae Je Kim, Gyeonggi-do (KR); Jae Sung Kwon, Seoul (KR); Woo Sung Yang, Seoul (KR); Jin Ho Yang, Gyeonggi-Do (KR); Hyun Kuk Lim, Daegu (KR)

(73) Assignee: Ezwon Tnternet Service Co., Ltd., Gyeonggi-Do (KR)

( * ) Notice: Subject to any disclaimer, the term of this patent is extended or adjusted under 35 U.S.C. 154(b) by 0 days.

(21) Appl. No.: 16/765,702

(22) PCT Filed: Jan. 8, 2019

(86) PCT No.: PCT/IB2019/050121
§ 371 (c)(1),
(2) Date: May 20, 2020

(87) PCT Pub. No.: WO2019/102445
PCT Pub. Date: May 31, 2019

(65) Prior Publication Data
US 2020/0384656 A1    Dec. 10, 2020

(30) Foreign Application Priority Data

Nov. 23, 2017   (KR) .......................... 10-2017-0157752

(51) Int. Cl.
*B25J 17/02*   (2006.01)
*B25J 9/10*    (2006.01)
*B25J 9/12*    (2006.01)

(52) U.S. Cl.
CPC .......... *B25J 17/0216* (2013.01); *B25J 9/106* (2013.01); *B25J 9/126* (2013.01)

(58) Field of Classification Search
CPC ........ B25J 17/0216; B25J 9/106; B25J 9/126; B25J 17/0275; B25J 17/02
See application file for complete search history.

(56) References Cited

U.S. PATENT DOCUMENTS

| 4,577,127 A | 3/1986 | Ferree et al. |
| 9,561,585 B2 * | 2/2017 | Tanaka .................... B25J 9/02 |

(Continued)

FOREIGN PATENT DOCUMENTS

| JP | H05138573 A | 6/1993 |
| JP | 2005144627 A | 6/2005 |

(Continued)

OTHER PUBLICATIONS

KR Office Action cited in Application No. 10-2017-0157752.
KR NOA cited in Application No. 10-2017-0157752.

*Primary Examiner* — Zakaria Elahmadi
(74) *Attorney, Agent, or Firm* — Mintz Levin Cohn Ferris Glovsky and Popeo, P.C.; Peter F. Corless

(57) ABSTRACT

A parallel type integrated actuator is proposed. The actuator includes: a driving unit composed of a first motor, a second motor, a third motor, and a fourth motor; a first shaft, a second shaft, and a third shaft, each shaft being inserted into each other through a hollow structure and forming a co-axis, each shaft being capable of rotating relative to each other in an inserted state, and each shaft having the other end part thereof extending outside the driving unit; an distal end part disposed outside the driving unit and on which an actuator is mounted; a first link part, a second link part, and a third link part allowing the distal end part to rotate in pitching, yawing, and rolling directions; and a universal link part (Continued)

connecting the fourth rotor, which is a rotor of the fourth motor, and the distal end part to each other.

21 Claims, 17 Drawing Sheets

(56) References Cited

U.S. PATENT DOCUMENTS

| | | | |
|---|---|---|---|
| 10,943,805 B2* | 3/2021 | Hudgens | ........... H01L 21/67754 |
| 2014/0154038 A1* | 6/2014 | Hudgens | .............. B25J 11/0095 |
| | | | 414/744.5 |

FOREIGN PATENT DOCUMENTS

| | | |
|---|---|---|
| JP | 2014037027 A | 2/2014 |
| KR | 19850004413 | 7/1985 |
| KR | 101472569 B1 | 12/2014 |
| KR | 101693246 B1 | 1/2017 |

* cited by examiner

[FIG. 1]
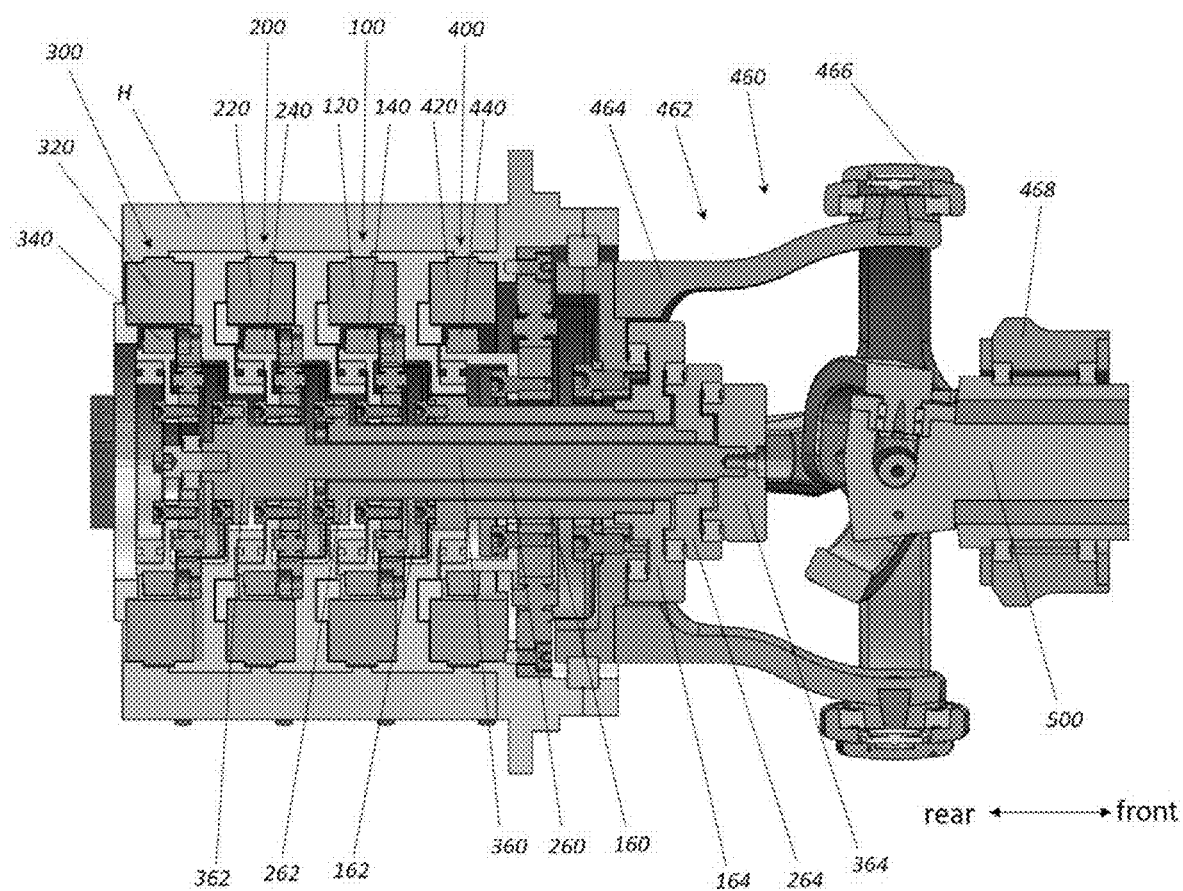

[FIG. 2]
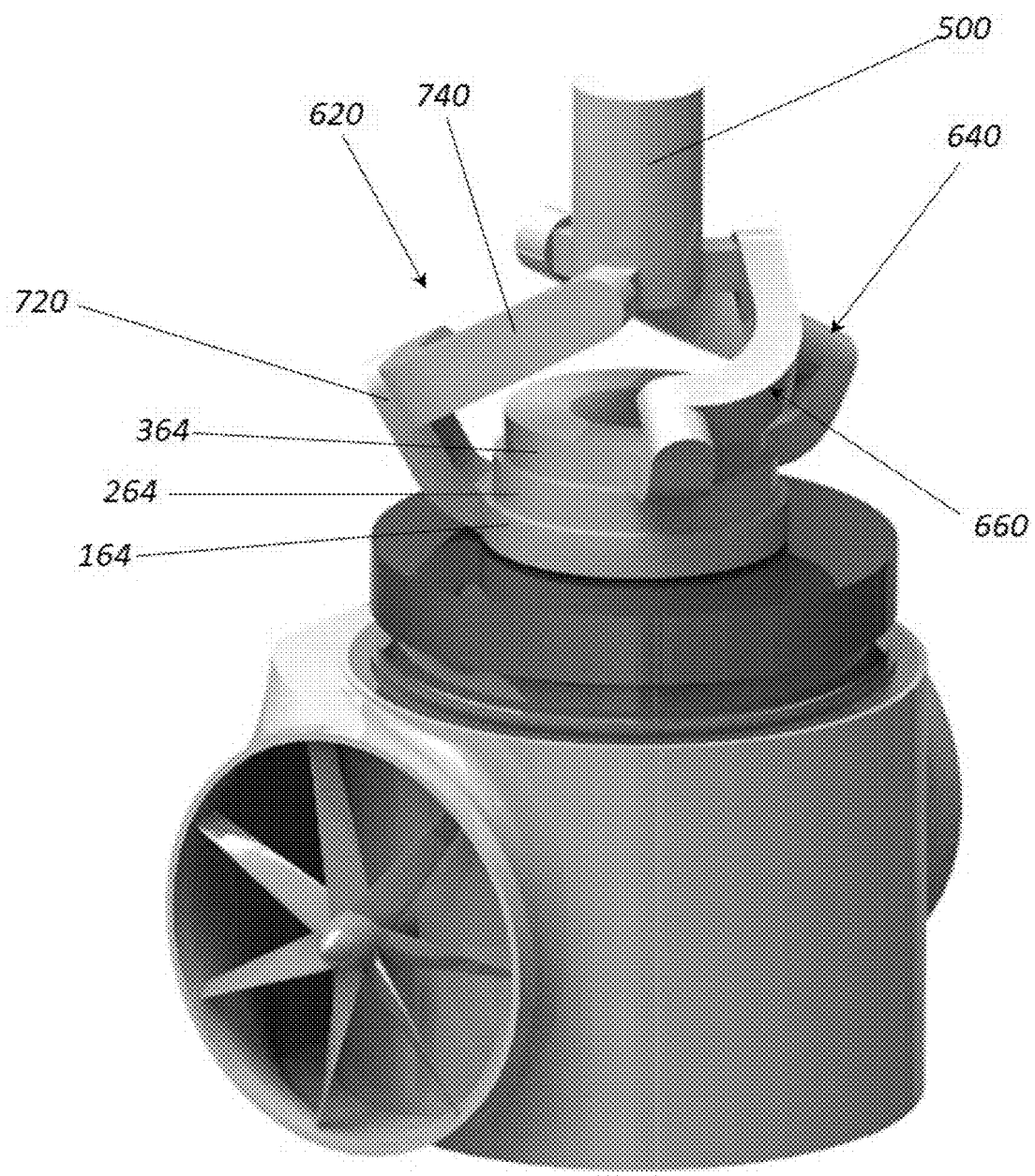

[FIG. 3]
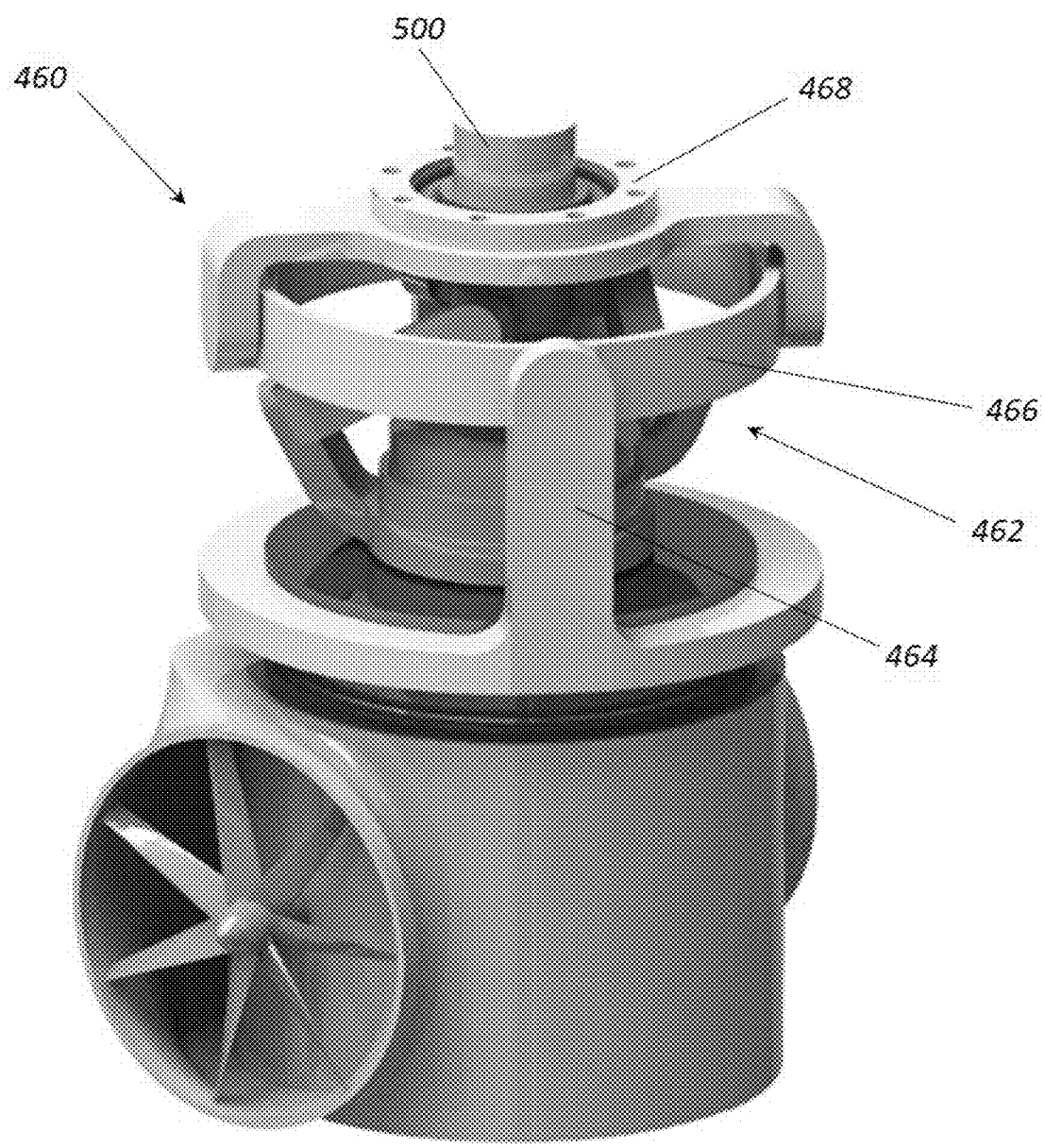

[FIG. 4]
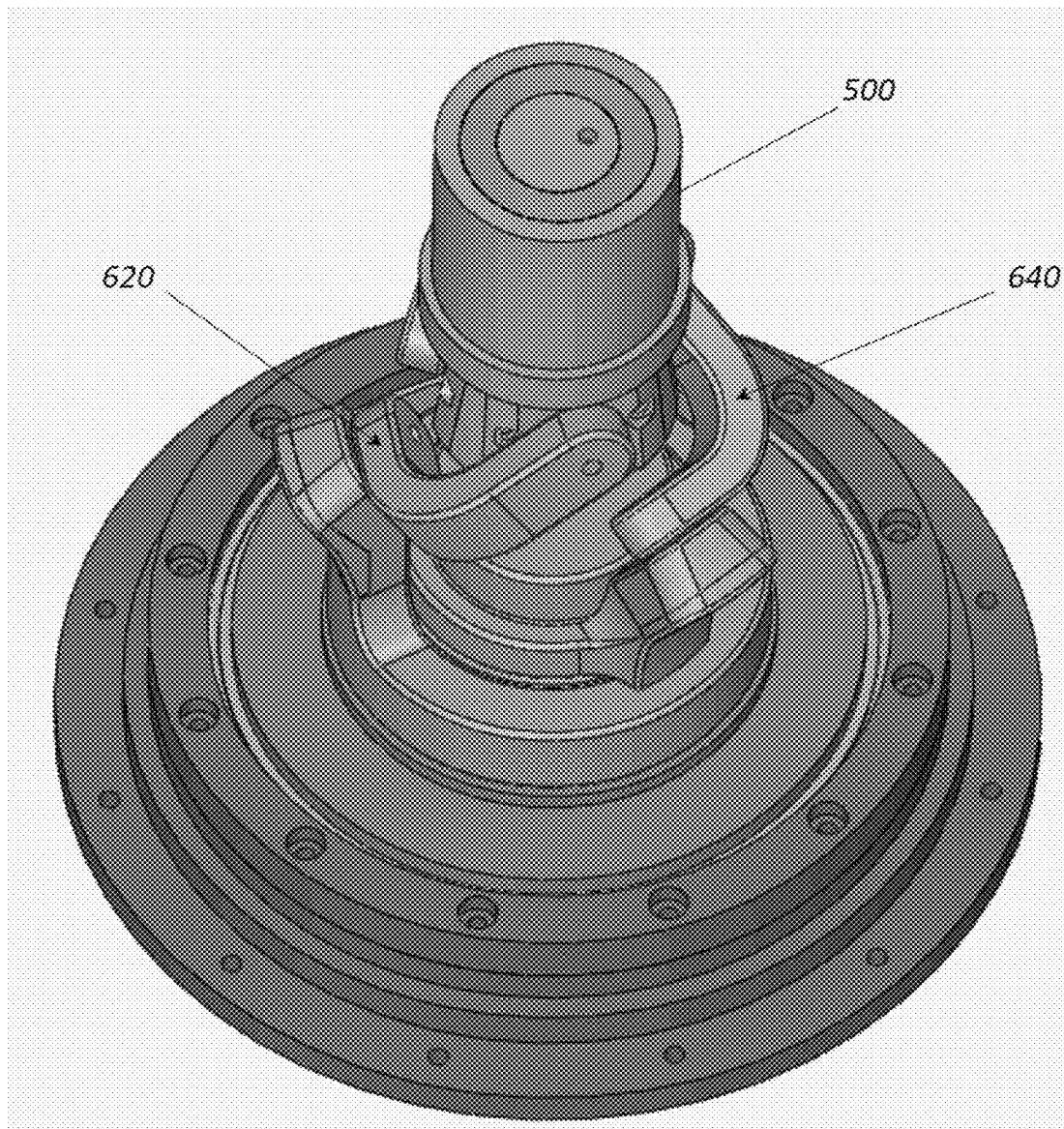

[FIG. 5]
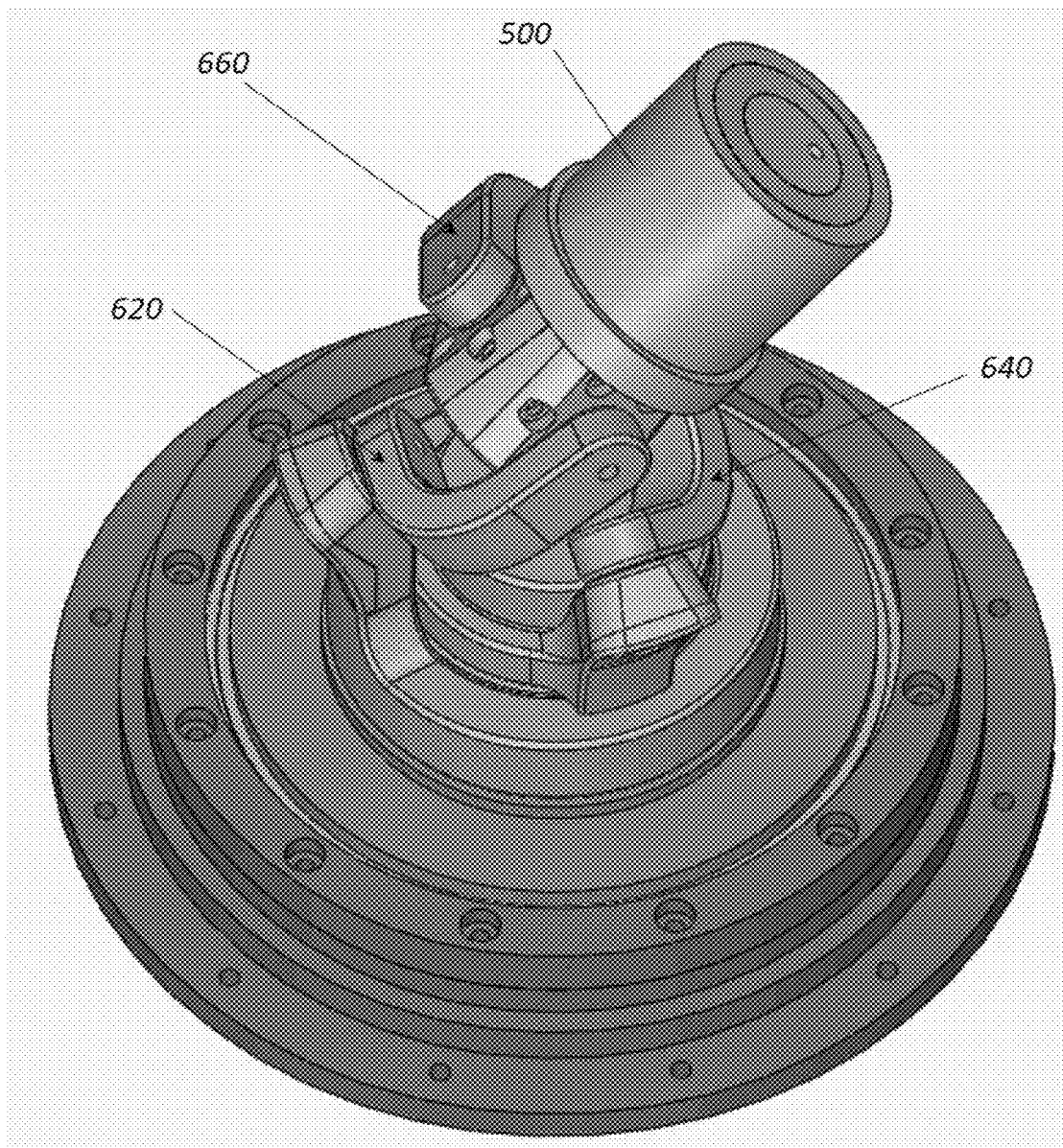

[FIG. 6]
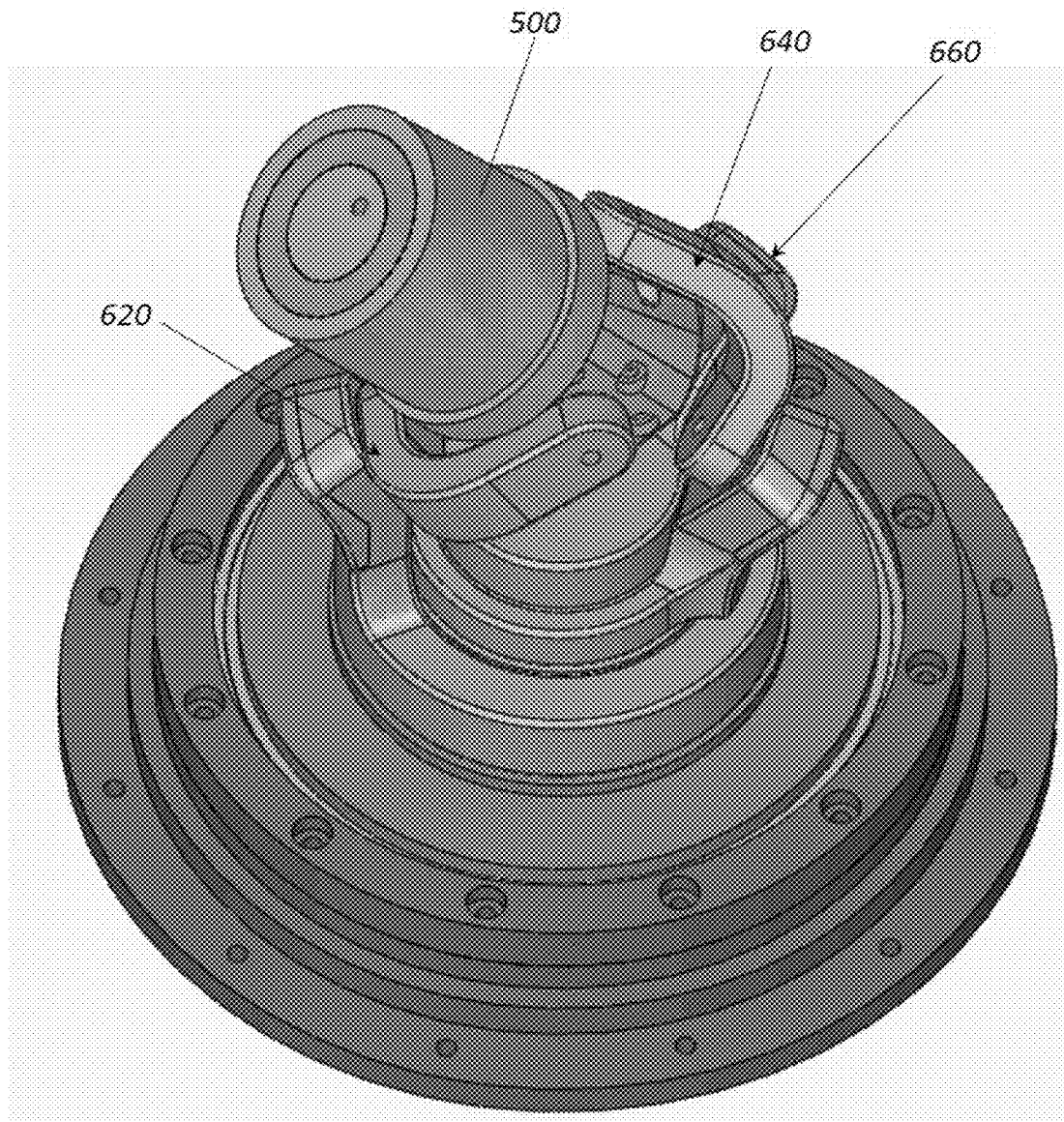

[FIG. 7]
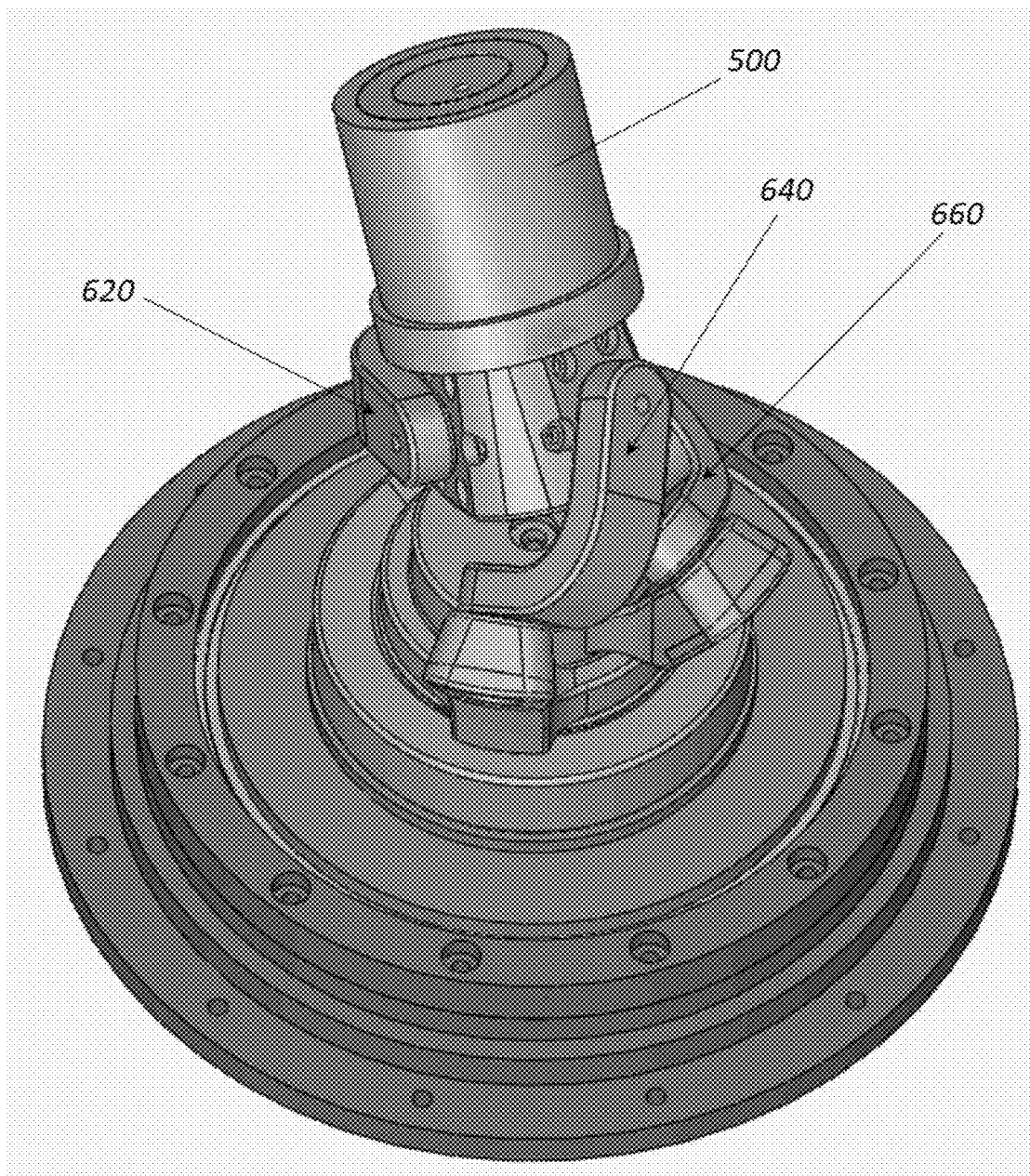

[FIG. 8]
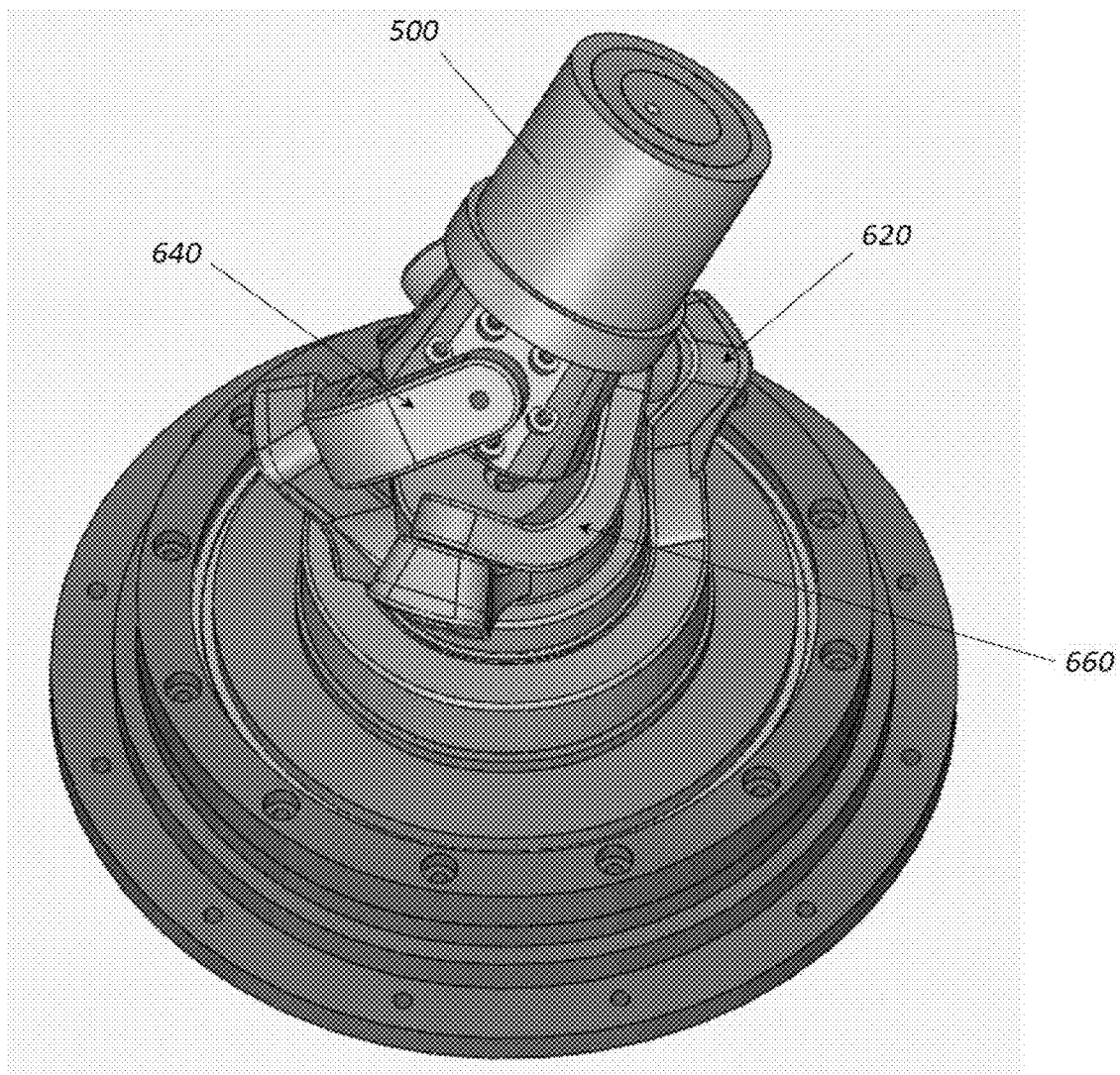

[FIG. 9]
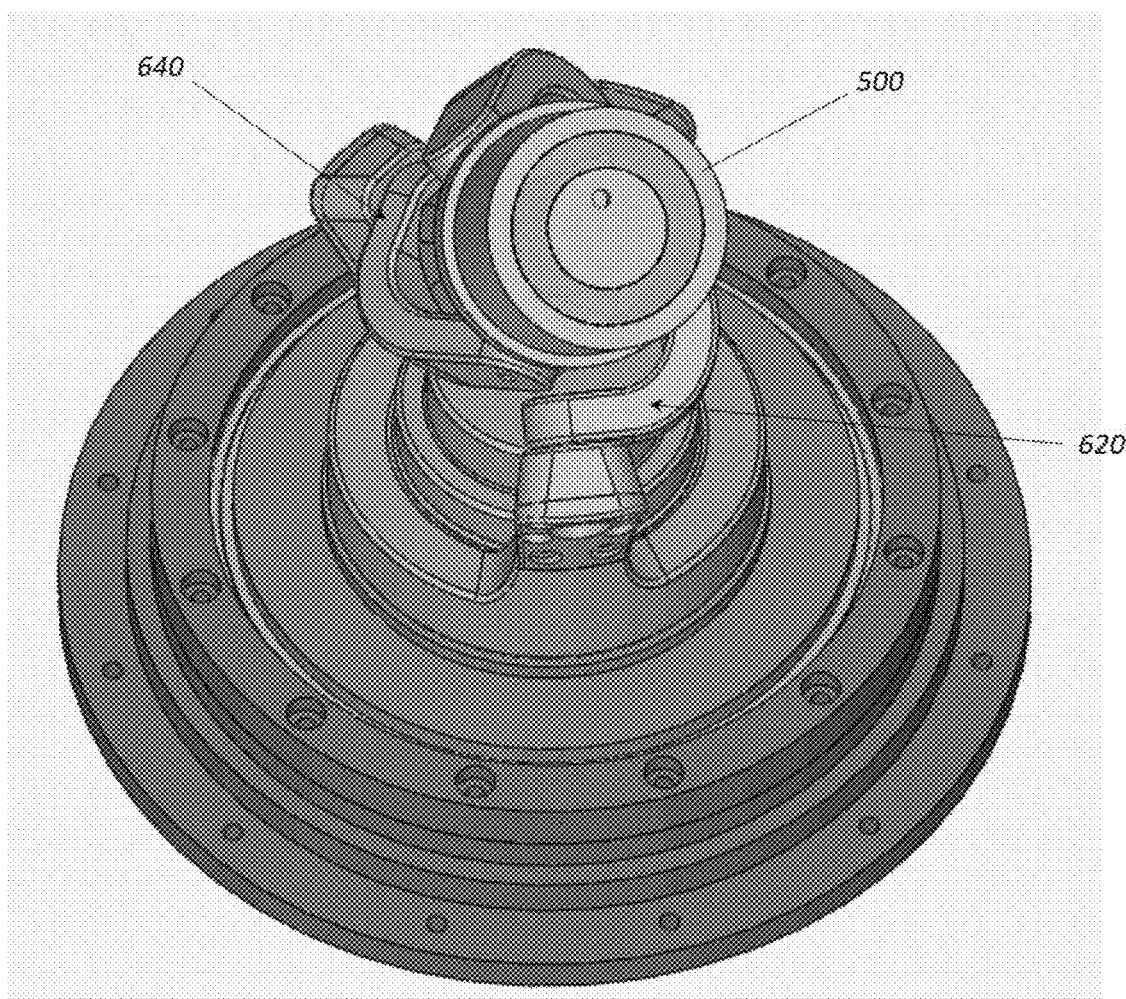

[FIG. 10]
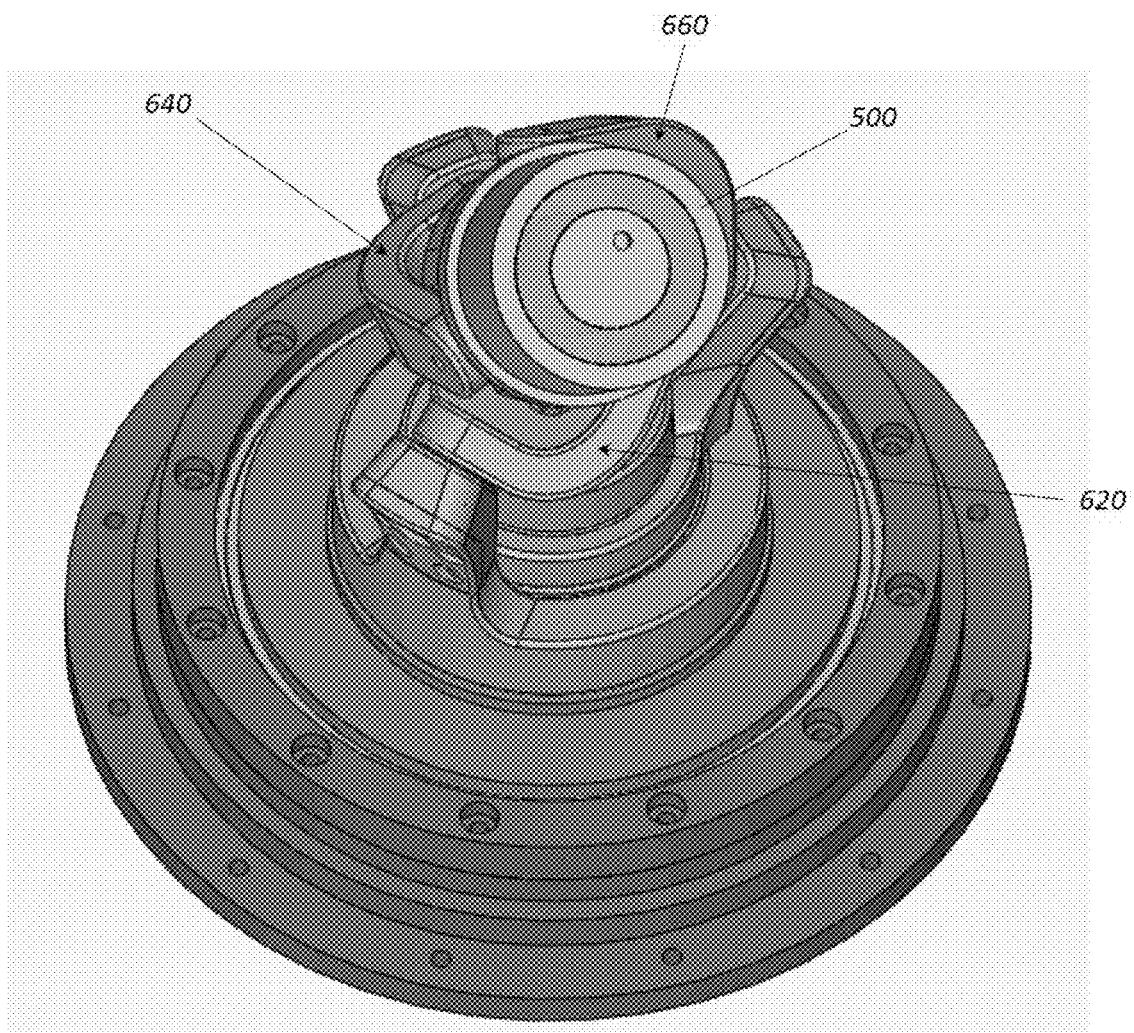

[FIG. 11]
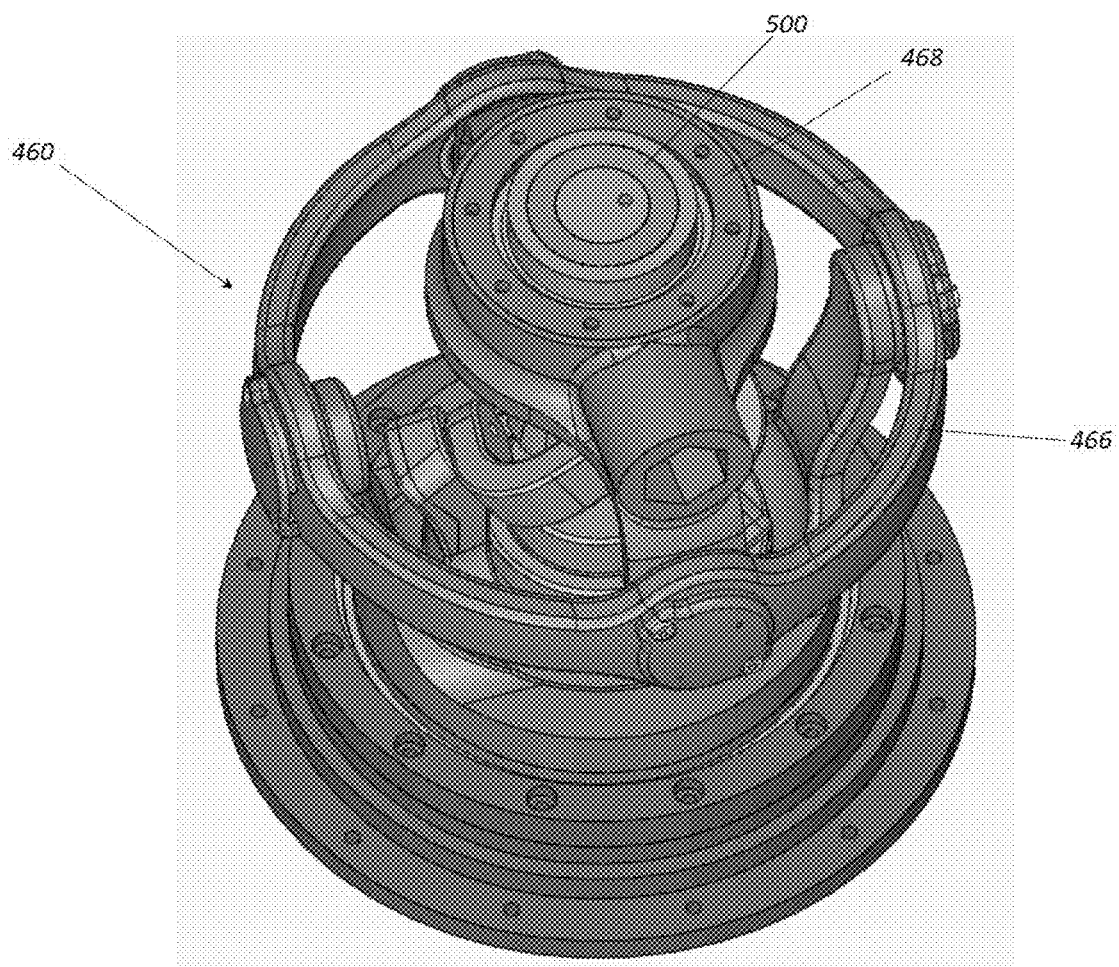

[FIG. 12]
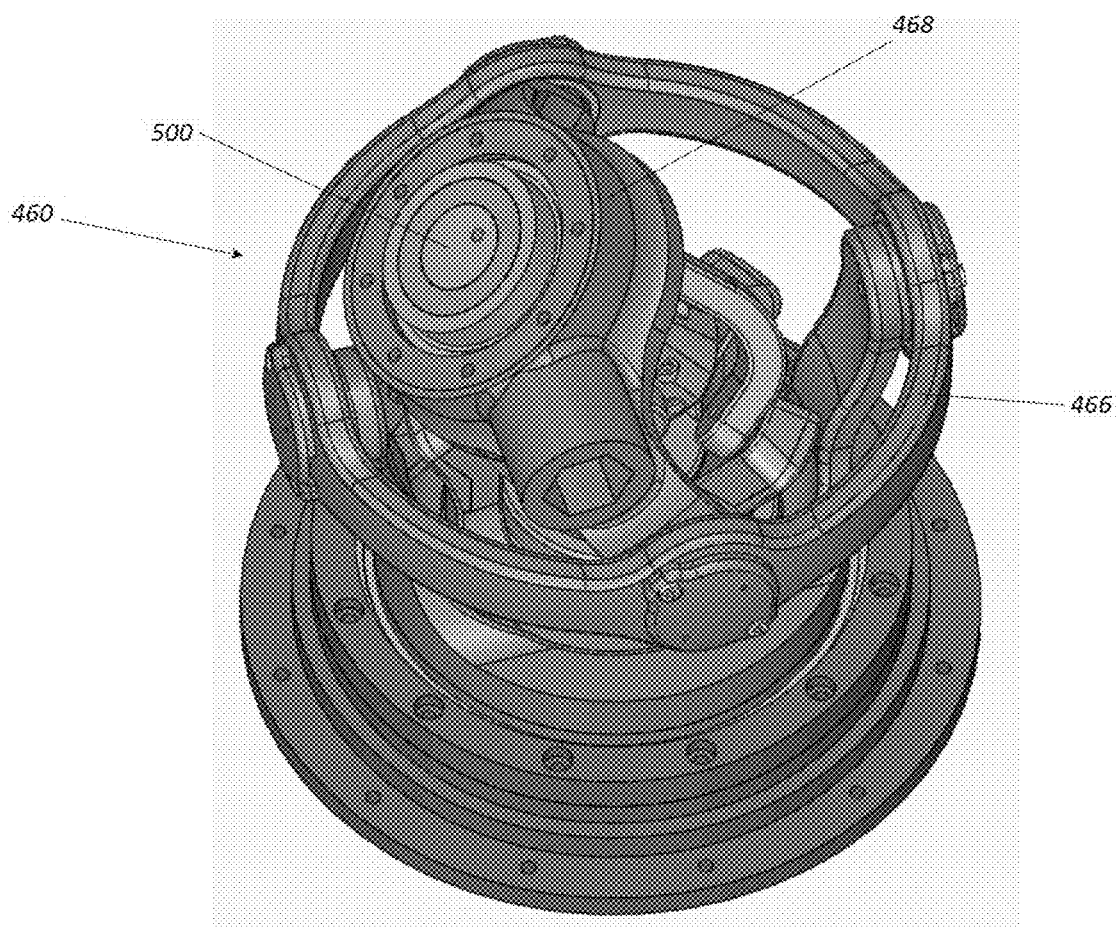

[FIG. 13]
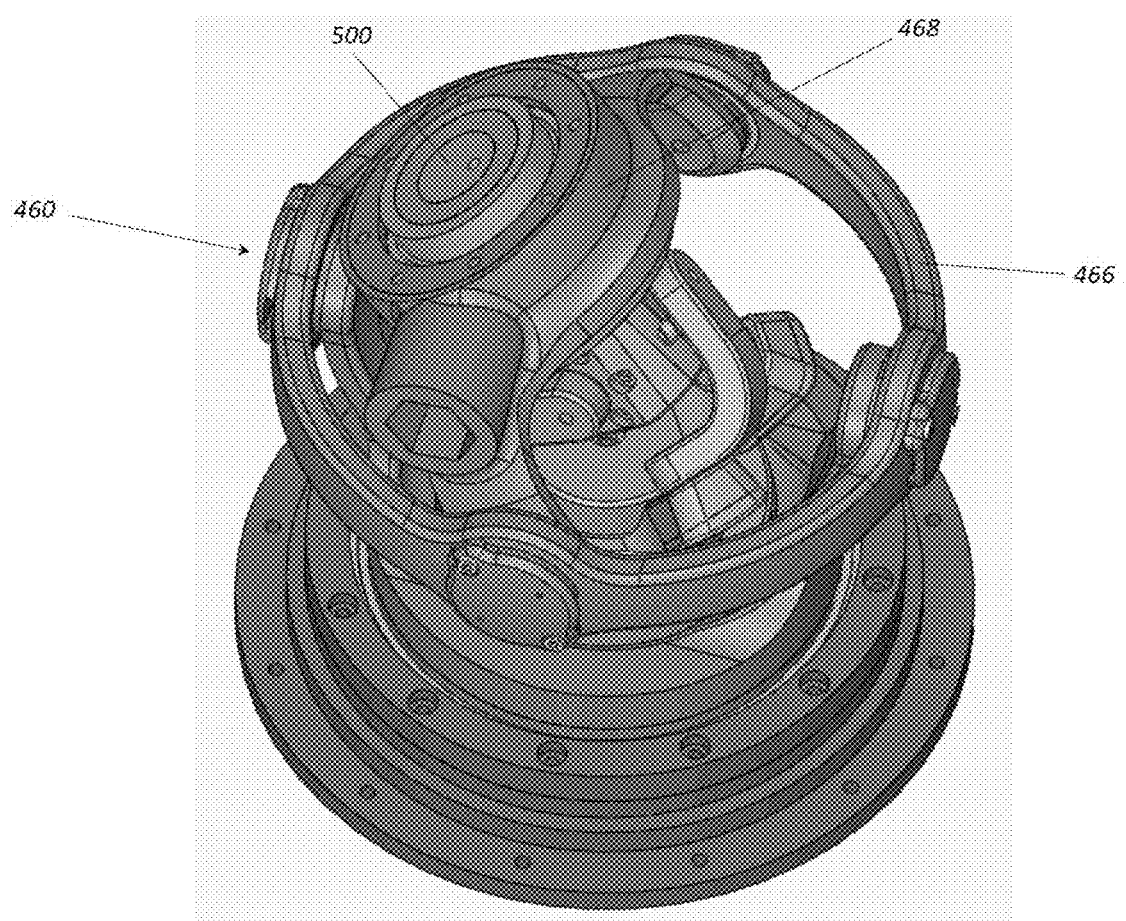

[FIG. 14]
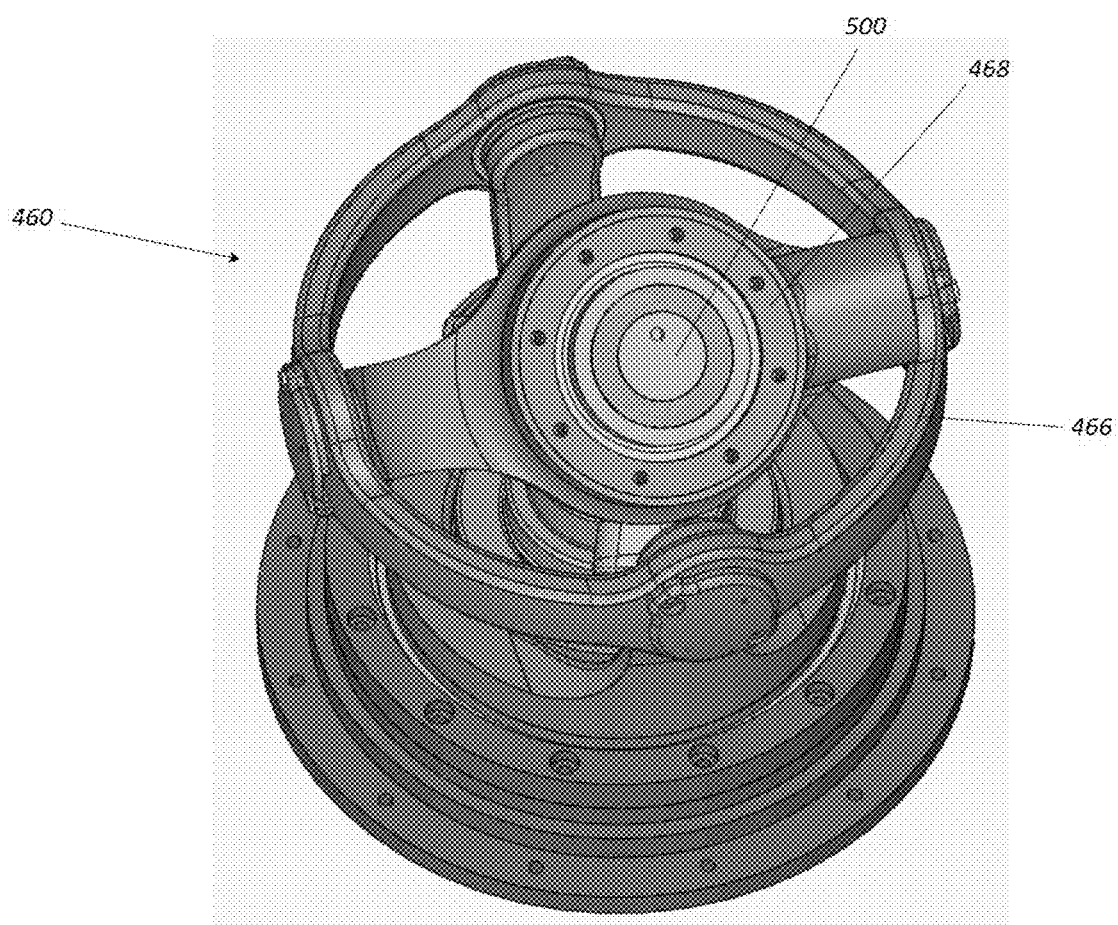

[FIG. 15]
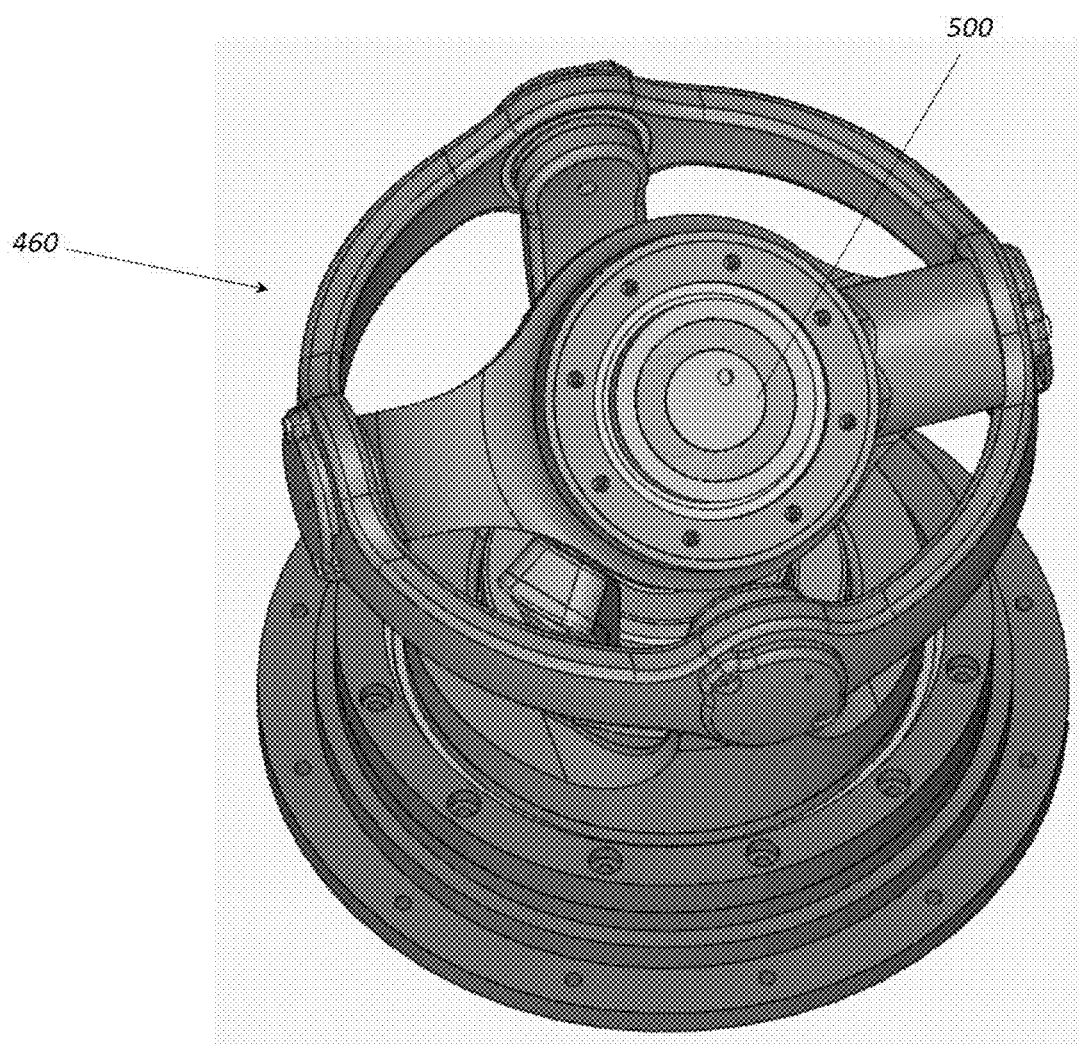

[FIG. 16]
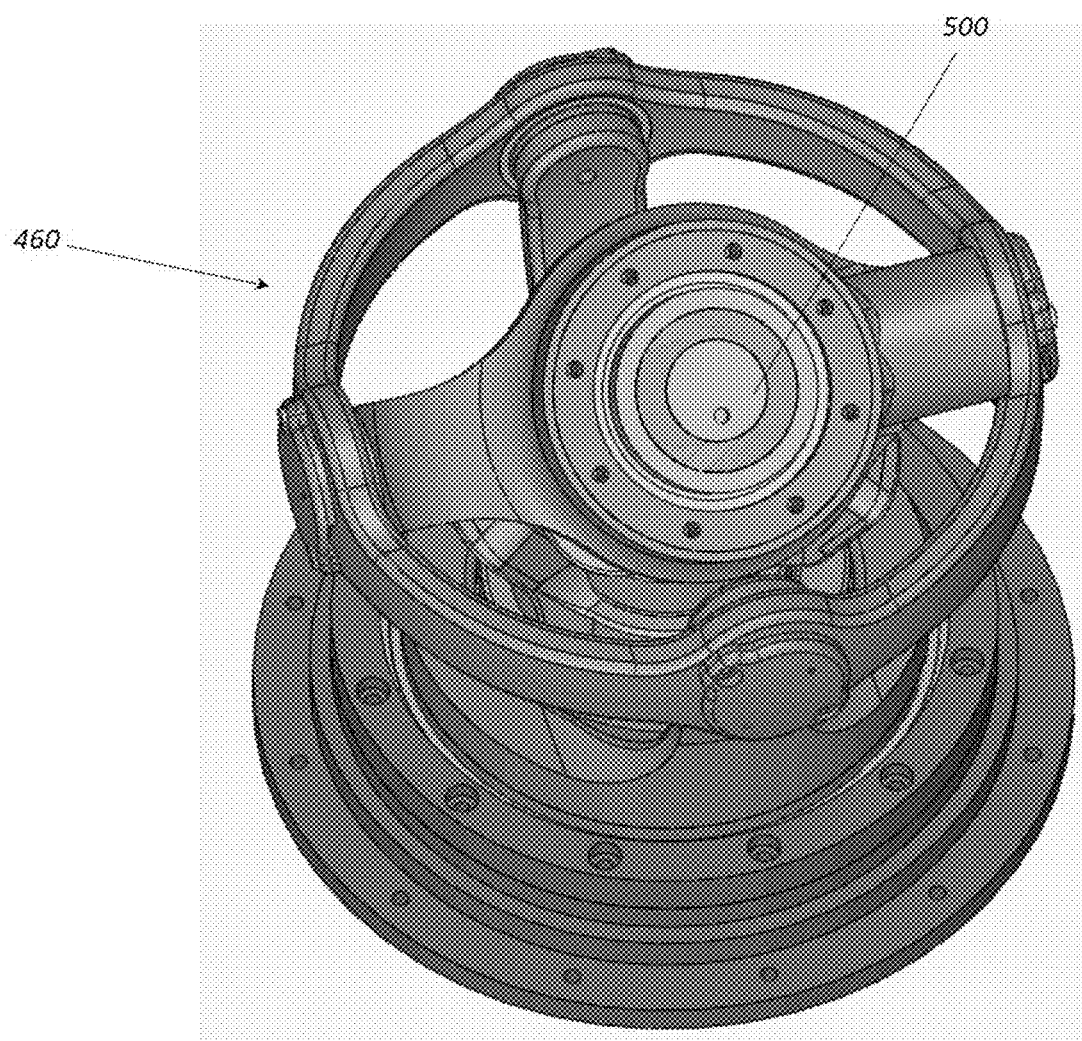

[FIG. 17]
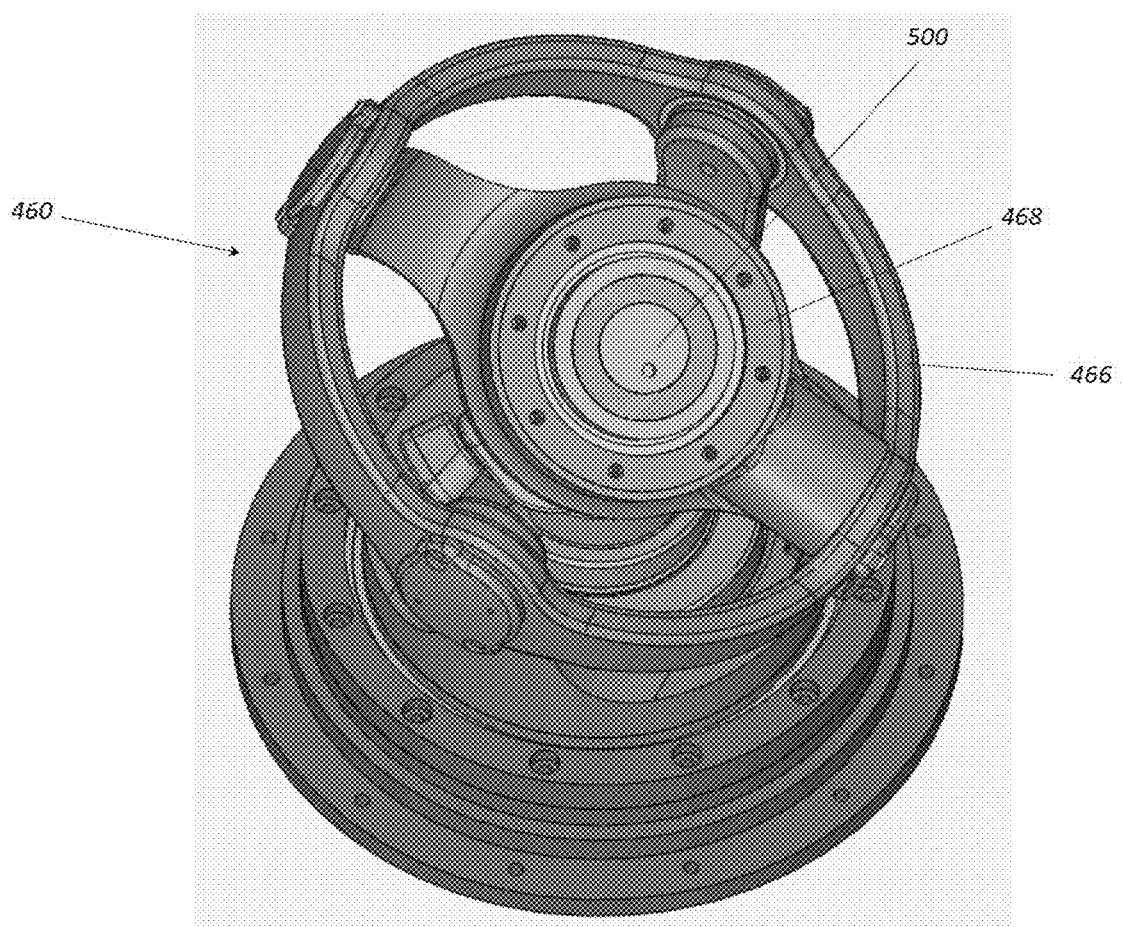

PARALLEL INTEGRATED DRIVE MECHANISM

CROSS-REFERENCES TO RELATED APPLICATIONS

This application is a 35 U.S.C. § 371 U.S. national entry of International Application No. PCT/IB2019/050121, having an International filing date of Jan. 8, 2019 which claims under 35 U.S.C. § 119 the benefit of Korean Application 10-2017-0157752 filed on Nov. 23, 2017. The entire contents of these applications are incorporated herein by reference in their entirety.

TECHNICAL FIELD

The present invention relates to a four-degree-of-freedom parallel type integrated actuator to be used in joints of a robot and the like to implement four degrees of freedom.

BACKGROUND ART

Mechanically configured rotators applied to joints of robots and the like may be classified into serial and parallel types according to a design method and interpretation thereof, and performance of the rotators may be measured according to a characteristic of each type. The serial type is applicable in large workspace and relatively easy for the design and interpretation thereof, and thereby is widely used.

However, since a serial type structure lacks precision due to an accumulation of actuator joint errors and is unable to provide relatively large power at the distal end of the structure, a device with a parallel type structure has recently been studied in order to solve this problem. The parallel type structure has high rigidity, has low inertia due to a design that the actuator is able to be placed on the base part, has high precision, and enables the actuator to generate great power at the distal end thereof, thereby providing good performance as a rotator. However, the parallel type structure has many peculiar characteristics that are hard to control, so the workspace is small and the interpretation is difficult. Therefore, a redundant link structure is added, an overdrive is added, or a serial-parallel combination type is designed in order to solve the problem and to enhance the performance.

In such a parallel type structure that is problematic, one of the structures derivatively developed by focusing on rotational motion is a spherical parallel structure in which a rotational axis of all joints in the spherical parallel structure coincides with a fixed point therein and makes a pure point-centered rotational motion. However, desktop devices based on the distal end of the spherical parallel structure are not intuitive for a specific joint movement because identifying the specific joint movement of a robot and providing a sense of a position and movement is impossible.

Whereas, an exoskeleton type structure is intuitively controllable by using motions of joints in the human body. However, an arrangement of joint axes of the rotator is an important design consideration for the rotator because a design constraint is high and an awkward movement may occur when the joint axes are not coincident.

The foregoing is intended merely to aid in the understanding of the background of the present invention, and is not intended to mean that the present invention falls within the purview of the related art that is already known to those skilled in the art.

An example of the related arts may be referred to Korean Patent No. 10-1693246 B1.

DISCLOSURE

Technical Problem

The present invention is proposed to solve such a problem and is to provide a parallel type integrated actuator capable of: reducing a volume of the entire structure thereof while maximally reducing interference of joints, having a low inertia of moving parts, and implementing the joint movement intuitively.

Technical Solution

In order to achieve the objective of the present invention, there is provided a parallel type integrated actuator including: a driving unit composed of a first motor, a second motor, a third motor, and a fourth motor which are stacked successively in a longitudinal direction of the driving unit, and each motor is provided with a stator fixed to a position on outside of the driving unit and a rotor respectively positioned on inside thereof, the rotors rotating relative to each other; a first shaft, a second shaft, and a third shaft, wherein each shaft is provided with one end part thereof respectively connected to the first rotor, the second rotor, and the third rotor, each of which is respectively the rotor of the first motor, the second motor, the third motor, at a position on inside of each rotor, wherein each shaft is inserted into each other through a hollow structure and forming a co-axis, wherein each shaft is capable of rotating relative to each other in an inserted state, and wherein each shaft is provided with other end part thereof extending toward the outside of the driving unit; a distal end part disposed at the position on the outside of the driving unit, and on which an actuator is mounted; a first link part, a second link part, and a third link part, each of which respectively connects the first shaft, the second shaft, and the third shaft to the distal end part and transmits rotational force of the first shaft, the second shaft, and the third shaft to the distal end part so as to allow the distal end part to rotate in pitching, yawing, and rolling directions; and a universal link part connecting the fourth rotor, which is the rotor of the fourth motor, and the distal end part to each other.

The first motor, the second motor, the third motor, and the fourth motor may be stacked so that an axis of rotation of each rotor may be coincident.

The first motor, the second motor, the third motor, and the fourth motor may be respectively provided with the stator and the rotor, all of which may be same size.

The first link part, the second link part, and the third link part may be respectively composed of a plurality of links.

The second shaft may be inserted into inside of the first shaft and the third shaft may be inserted into inside of the second shaft.

The third motor may be positioned at a rearmost side, and the second motor and the first motor may be disposed in front of the third motor in succession.

A length of the third shaft may be longest, and a length of the second shaft may be shorter than that of the third shaft and a length of the first shaft may be shorter than that of the second shaft in order.

A rear-end part of the third shaft may be disposed at a rearmost end, a rear-end part of the second shaft and a rear-end part of the first shaft may be disposed in front of the third shaft, and each rear-end part of the shafts may be connected to each rotor corresponding to each motor.

The front-end part of the third shaft may extend to be closest to the distal end part, and each of the front-end part of the second shaft and the front-end part of the first shaft may be disposed at a position in a direction away from the distal end part.

A rear-end part of each link may be respectively connected to the front-end part of each shaft, and the front-end part of each link may be spaced apart from each other along a circumference of a rear-end part of the distal end part and connected thereto.

The front-end part of each link may be spaced apart from each other along the circumference of the distal end part at a same height and may be connected to the distal end part.

Each link may be composed of a first link section and a second link section, in which a rear-end part of the first link section may be respectively and rotatably coupled to each shaft, a rear-end part of the second link section may be rotatably connected to the front-end part of the first link section, and the front-end part of the second link section may be rotatably connected to the distal end part.

The first link section may be bent and extended in an oblique direction to the outside in a state where each rear-end part of the first link section may be respectively connected to each shaft, and the second link section may be connected to the distal end part by being bent inwardly toward the distal end part once more after being extended to the side once in a state where the rear-end part of the second link section may be connected to the front-end part of the first link section.

Any one of the first rotor, the second rotor, and the third rotor may be fixed, and the remaining rotors may be rotated so that the distal end part may perform the pitching motion.

The first rotor, the second rotor, and the third rotor may be rotated in the same magnitude and direction by the distal end part to perform a rolling motion.

The universal link part may have a form in which the center thereof may passed through by the distal end part, and may be provided with a joint part relatively and rotatably coupled to the distal end part, one side thereof being connected to the fourth rotor and rotated with the fourth rotor, and the other side thereof being composed of a connection part connected to the joint part so as to be relatively rotatable.

The joint part may be rotated relative to the distal end part about a longitudinal axis of the distal end part, and may be relatively rotated with the connection part about an axis perpendicular to the longitudinal axis of the distal end part.

The connection part may have a ring shape surrounding the outside of the joint part, and may include a ring part connected to rotate relative to the joint part about an axis perpendicular to the longitudinal axis of the distal end part and a transmission part connecting the ring part and the fourth rotor to each other to be relatively rotated with the ring part about an axis perpendicular to an axis connecting the joint part and the ring part to each other.

The first rotor, the second rotor, the third rotor, and the fourth rotor may be rotated in the same magnitude and direction so that the distal end part may perform a yawing motion.

The first rotor, the second rotor, and the third rotor may be fixed so that the distal end part may be not rotated, whereas the fourth rotor may be rotated, whereby the joint part may rotate relative to the distal end part.

The connection part may extend from the outside of each link part to the joint part side and may be connected to the joint part.

Advantageous Effects

According to the parallel type integrated actuator of the present invention, in realizing joints with four degrees of freedom, reproducing a free motion is possible while avoiding a collision between the instruments.

By realizing basic three degrees of freedom of pitching, yawing, and rolling, and simultaneously adding another rolling thereto, another motion of a manipulator may be realized simultaneously at the end of the joints.

While realizing four degrees of freedom, a volume and weight of the joint actuator as a whole may be maximally reduced.

DESCRIPTION OF DRAWINGS

FIG. 1 is a cross-sectional view showing a parallel type integrated actuator according to an exemplary embodiment of the present invention.

FIGS. 2 and 3 are perspective views showing the parallel type integrated actuator shown in FIG. 1.

FIGS. 4 to 10 are views showing operation process of the parallel type integrated actuator shown in FIG. 1.

FIGS. 11 to 17 are another view showing the parallel type integrated actuator shown in FIG. 1.

MODE FOR INVENTION

FIG. 1 is a cross-sectional view showing a parallel type integrated actuator according to an exemplary embodiment of the present invention, FIGS. 2 and 3 are perspective views showing the parallel type integrated actuator shown in FIG. 1, FIGS. 4 to 10 are views showing operation process of the parallel type integrated actuator shown in FIG. 1, and FIGS. 11 to 17 are another view showing the parallel type integrated actuator shown in FIG. 1.

FIG. 1 is the cross-sectional view showing the parallel type integrated actuator according to the exemplary embodiment of the present invention, in which the parallel type integrated actuator according to the present invention includes: a driving unit composed of a first motor 100, a second motor 200, a third motor 300, and a fourth motor 400 which are stacked successively in a longitudinal direction of the driving unit, and each of the motors is provided with a stator fixed to a position on the outside of the driving unit and a rotor respectively located on the inside thereof, the motors rotating relative to each other; a first shaft 160, a second shaft 260, and a third shaft 360, wherein each shaft is provided with one end part thereof respectively connected to the first rotor 140, the second rotor 240, and the third rotor 340, each of which is respectively a rotor of the first motor 100, the second motor 200, the third motor 300, at a position on the inside of each rotor, wherein each shaft is inserted into each other through a hollow structure and forming a co-axis, wherein each shaft is capable of rotating relative to each other in the inserted state, and wherein each shaft is provided with the other end part thereof extending toward the outside of the driving unit; a distal end part 500 disposed at a position on the outside of the driving unit, and on which an actuator is mounted; a first link part 620, a second link part 640, and a third link part 660, each of which respectively connects the first shaft 160, the second shaft 260, and the third shaft 360 to the distal end part 500 and transmits the rotational force of the first shaft 160, the second shaft 260, and the third shaft 360 to the distal end part 500 so as to allow the distal end part 500 to rotate in the pitching, yawing, and rolling directions; and a universal link part 460 connecting the fourth rotor 440, which is a rotor of the fourth motor 400, and the distal end part 500 to each other.

The parallel type integrated actuator of the present invention is composed of a plurality of motors, wherein three motors are responsible for controlling the pitching, yawing, and rolling directions of the parallel type integrated actuator, and the remaining motor is to implement a separate independent rolling. Through this, the parallel type integrated actuator has four degrees of freedom, so that effective simulation of joints of the human body is possible.

In addition, the parallel type integrated actuator of the present invention has an advantage of being compact in size by stacking four motors and being further compact in size by overlapping a plurality of links in the driving modules as well.

Particularly, the first motor 100, the second motor 200, the third motor 300, and the fourth motor 400 may be stacked so that the axis of rotation of each rotor is coincident. In addition, the first motor 100, the second motor 200, the third motor 300, and the fourth motor 400 may be implemented in a compact size by making the size of each stator and the rotor the same. In addition, a single housing H having a cylindrical shape may be shared.

The first motor 100, the second motor 200, the third motor 300, and the fourth motor 400, each of which is provided with the stator fixed to the housing H at a position outside of the each motor, and provided with the rotor respectively placed at a position inside thereof, the motors rotating relative to each other, are stacked successively in the longitudinal direction.

To each rotor, a shaft is respectively connected and rotates with the rotor. Particularly, in the case of the first shaft 160, the second shaft 260, and the third shaft 360, one end parts 162, 262, and 362 are respectively connected to the first rotor 140, the second rotor 240, and the third rotor 340 at the inside of each rotor, are inserted into each other through a hollow structure and form a co-axis, and are capable of rotating relative to each other in the inserted state. In addition, the other end parts of the shaft 164, 264, and 364 extend toward the outside of the driving unit. In other words, by connecting the three shafts in the form of a hollow structure, the diameter of the entire shaft unit becomes very small and the overall size becomes compact.

In addition, the distal end part 500 being rotated through the actual driving force is disposed at a position the outside of the driving unit, and the necessary mechanisms are mounted to the distal end part 500 in various ways. The first link part 620, the second link part 640, and the third link part 660 respectively connect the first shaft 160, the second shaft 260, the third shaft 360 to the distal end part 500 and transmit the rotational force of the first shaft 160, the second shaft 260, the third shaft 360 to the distal end part 500 so as to allow the distal end part 500 to rotate in the pitching, yawing, and rolling directions. Finally, the universal link part 460 which connects the fourth rotor 440 of the fourth motor 400 and the distal end part 500 to each other is provided to additionally implement separate independent rolling at the distal end part 500 side. Therefore, when the parallel type integrated actuator of the present invention is applied to a joint for a robot and the like, the basic pitching, yawing, and rolling of the joint are implemented, and at the same time, other joints may also be driven by using an additional independent rolling motion. For example, when the parallel type integrated actuator of the present invention is applied to a shoulder joint of a robot, an intrinsic motion of the shoulder having two degrees of freedom is realized, and by using additional rolling, a bent motion of the upper and lower muscles of the arm may be performed together. In this case, a separate actuator on the elbow is not necessary, and there is an advantage of reducing the size and weight of the overall driving unit.

Meanwhile, the first link part 620, the second link part 640, and the third link part 660 may respectively be composed of a plurality of links. Particularly, the rear-end part of each link may be connected to the front-end part of each corresponding shaft, and the front-end part of each link may be spaced apart along a circumference of the rear-end part of the distal end part 500 and connected thereto. Here, a front-end part of each link is spaced apart from each other along the circumference of the distal end part 500 at the same height, and may be connected to the distal end part 500. Accordingly, the length of the distal end part 500 may be reduced, and the volume of the distal end part 500 may be reduced as much as possible. Preferably, the front-end part of each link may be spaced apart from each other at intervals of 120 degrees at the same height of the distal end part 500 and connected thereto.

Explaining the link in detail, each link is composed of a first link section 720 and a second link section 740, wherein the rear-end part of the first link section 720 may be rotatably coupled to the shaft, the rear-end part of the second link section 740 may be rotatably connected to the front-end part of the first link section 720, and the front-end part of the second link section 740 may be rotatably connected to the distal end part 500. In particular, as shown in FIG. 2, the first link section 720 is bent and extended in an oblique direction to the outside in a state where the rear-end part thereof is connected to a shaft, and the second link section 740 may be connected to the distal end part 500 by being bent inwardly toward the distal end part 500 once more after being extended to the side once in the state where the rear-end part of the second link section 740 is connected to the front-end part of the first link section 720. This structure of the link prevents mutual interference from occurring during the various motions of rolling, pitching, and yawing.

Meanwhile, in the mutual coupling method of the shafts, the second shaft 260 may be inserted into inside the first shaft 160, and the third shaft 360 may be inserted into inside the second shaft 260. In other words, the three shafts are inserted into each other in the form of a hollow structure to make one large shaft as a whole. Accordingly, the third motor 300 may be positioned at the rearmost side, the second motor 200 may be disposed in front of the third motor 300, and the first motor 100 may be successively disposed in front of the second motor 200.

In such a combination of shafts and motors, the length of the third shaft 360 may be the longest, and the shaft length may be shortened one after another in the order of the second shaft 260 and the first shaft 160. In addition, the rear-end part of the third shaft 360 may be disposed at the rearmost end, the rear-end part of the second shaft 260 may be placed in the front of the third shaft, the rear-end part of the first shaft 160 may be placed in the front of the second shaft, and the rear-end part of each shaft may be connected to the rotor of the corresponding motor. In addition, the front-end part of the third shaft 360 may extend to be closest to the distal end part 500, and the front-end part of the second shaft 260, followed by the front-end part of the first shaft 160, may be placed at each position in a direction away from the distal end part 500. Through this structure, each shaft is inserted into the hollow structure, and at the same time, the size of each motor may be made the same, and even when being connected to the distal end part 500, the shafts are connected to each other at different heights at different angles, whereby there is an advantage in that interference between links is maximally reduced and a marginal angle that may be expressed by the distal end part 500 is eventually increased when performing motions such as rolling, pitching, and yawing.

In performing motions, any one of the first rotor 140, the second rotor 240, and the third rotor 340 may be fixed, and the remaining rotors may be rotated so that the distal end part 500 may perform the pitching motion. FIGS. 4 to 6 illustrate the pitching motion of the distal end part 500. In this case, the first rotor 140 is fixed without moving, and thus the first link does not move neither. In that state, when the second link and the third link are separated from each other by the rotation of the second rotor 240 and the third rotor 340, the distal end part 500 is pitched to the right side as shown in FIGS. 4 and 5. Whereas, when the second link and the third link are closer to each other, the distal end part 500 is pitched to the left side as shown in FIGS. 5 and 6. Accordingly, any one of the first rotor 140, the second rotor 240, and the third rotor 340 may be fixed, and the remaining rotors are rotated so that the distal end part 500 may perform the pitching motion.

Meanwhile, as shown in FIGS. 6 to 9, when there is no universal link part 460, the first rotor 140, the second rotor 240, and the third rotor 340 rotate with the same magnitude and direction so that the distal end part 500 may perform the yawing motion. However, in the case of the present invention, since there is a universal link part 460, the universal link part 460 should also be rotated together for the necessary yawing motion. In other words, as shown in FIGS. 12 to 14, the first rotor 140, the second rotor 240, the third rotor 340, and the fourth rotor 440 are rotated with the same magnitude and direction, and thus the distal end part 500 may perform the yawing motion. When the first link, the second link, the third link, and the universal link part 460 rotate in the same way, the distal end part 500 performs the yawing motion as a whole. In addition, when the first rotor 140, the second rotor 240, and the third rotor 340 simultaneously rotate while the fourth rotor 440 is fixed, the rolling motion of the distal end part 500 is realized as shown in FIGS. 14 to 16. In other words, when the first rotor 140, the second rotor 240, and the third rotor 340 simultaneously rotate, in the case where the universal link unit 460 is not present, the yawing is realized as shown in FIGS. 6 to 9, and in the case where the universal link unit 460 is present, the rolling is realized in a fixed state of the universal link part 460 as shown in FIGS. 14 to 16. In addition, in the case where the universal link unit 460 is present, the universal link part 460 is also necessary to rotate together in order to implement the yawing motion.

Meanwhile, the universal link part 460 has a form in which the center thereof is passed by the distal end part 500, and may be provided with a joint part 468 relatively and rotatably coupled to the distal end part 500, and a connection part 462 of which one side is connected to the fourth rotor 440 and rotate with the fourth rotor 440 and the other side is connected to the joint part 468 so as to be relatively rotatable. In addition, the joint part 468 may be rotated relative to the distal end part 500 about the longitudinal axis of the distal end part 500, and may be relatively rotated with the connection part 462 about an axis perpendicular to the longitudinal axis of the distal end part 500. In addition, the connection part 462 has a ring shape that surrounds the outside of the joint part 468 and may be configured to include: a ring part 466 connected to rotate relative to the joint part 468 about an axis perpendicular to the longitudinal axis of the distal end part 500; and a transmission part 464 connecting the ring part 466 and the fourth rotor 440 to each other and connected to the ring part 466 to be rotated relative to the ring part 466 about an axis perpendicular to an axis connecting the joint part 468 and the ring part 466 to each other. Through this structure, the rolling and yawing of the distal end part 500 is realized, and the universal link part 460 is not interfered in the process of pitching as shown in FIGS. 11 and 12 and serves a role as a universal joint.

Meanwhile, as shown in FIGS. 16 and 17, the first rotor 140, the second rotor 240, and the third rotor 340 are fixed so that the distal end part 500 is not rotated, but the fourth rotor 440 is rotated. Therefore, the joint part may rotate relative to the distal end part 500. In addition, through this process, separate and independent rolling of the joint part may be possible, and this rolling may be realized simultaneously with rolling, pitching, and yawing motion of the distal end part 500. This separate rolling is generated through another mechanism, thereby outputting the motion having four degrees of freedom in one joint.

According to the parallel type integrated actuator of the present invention, in realizing joints with four degrees of freedom, reproducing a free motion is possible while avoiding a collision between the instruments.

By realizing basic three degrees of freedom of pitching, yawing, and rolling, and simultaneously adding rolling thereto, another motion of a manipulator may be realized simultaneously at the end of the joints.

While realizing four degrees of freedom, a volume and weight of the joint actuator as a whole may be maximally reduced.

Although a preferred embodiment of the present invention has been described for illustrative purposes, those skilled in the art will appreciate that various modifications, additions and substitutions are possible, without departing from the technical scope and spirit of the invention as disclosed in the accompanying claims.

<Description of Drawings>

| | |
|---|---|
| 100: first motor | 200: second motor |
| 300: third motor | 400: fourth motor |
| 500: distal end part | |

The invention claimed is:

1. A parallel type integrated actuator comprising:
a driving unit composed of a first motor, a second motor, a third motor, and a fourth motor which are stacked successively in a longitudinal direction of the driving unit, and each motor is provided with a stator fixed to a position on outside of the driving unit and a rotor respectively positioned on inside thereof, the rotors rotating relative to each other;
a first shaft, a second shaft, and a third shaft, wherein each shaft is provided with one end part thereof respectively connected to the first rotor, the second rotor, and the third rotor, each of which is respectively the rotor of the first motor, the second motor, the third motor, at a position on inside of each rotor, wherein each shaft is inserted into each other through a hollow structure and forming a co-axis, wherein each shaft is capable of rotating relative to each other in an inserted state, and wherein each shaft is provided with other end part thereof extending toward the outside of the driving unit;

a distal end part disposed at the position on the outside of the driving unit, and on which an actuator is mounted;

a first link part, a second link part, and a third link part, each of which respectively connects the first shaft, the second shaft, and the third shaft to the distal end part and transmits rotational force of the first shaft, the second shaft, and the third shaft to the distal end part so as to allow the distal end part to rotate in pitching, yawing, and rolling directions; and a universal link part connecting the fourth rotor, which is the rotor of the fourth motor, and the distal end part to each other.

2. The parallel type integrated actuator of claim 1, wherein the first motor, the second motor, the third motor, and the fourth motor are stacked so that an axis of rotation of each rotor is coincident.

3. The parallel type integrated actuator of claim 1, wherein the first motor, the second motor, the third motor, and the fourth motor are respectively provided with the stator and the rotor, all of which are same size.

4. The parallel type integrated actuator of claim 1, wherein the first link part, the second link part, and the third link part are respectively composed of a plurality of links.

5. The parallel type integrated actuator of claim 1, wherein the second shaft is inserted into inside of the first shaft and the third shaft is inserted into inside of the second shaft.

6. The parallel type integrated actuator of claim 1, wherein the third motor is positioned at a rearmost side, and the second motor and the first motor are disposed in front of the third motor in succession.

7. The parallel type integrated actuator of claim 1, wherein a length of the third shaft is longest, and a length of the second shaft is shorter than that of the third shaft and a length of the first shaft is shorter than that of the second shaft in order.

8. The parallel type integrated actuator of claim 7, wherein a rear-end part of the third shaft is disposed at a rearmost end, a rear-end part of the second shaft and a rear-end part of the first shaft are disposed in front of the third shaft, and each rear-end part of the shafts is connected to each rotor corresponding to each motor.

9. The parallel type integrated actuator of claim 7, wherein the front-end part of the third shaft extends to be closest to the distal end part, and each of the front-end part of the second shaft and the front-end part of the first shaft is disposed at a position in a direction away from the distal end part.

10. The parallel type integrated actuator of claim 9, wherein a rear-end part of each link is respectively connected to the front-end part of each shaft, and the front-end part of each link is spaced apart from each other along a circumference of a rear-end part of the distal end part and connected thereto.

11. The parallel type integrated actuator of claim 10, wherein the front-end part of each link is spaced apart from each other along the circumference of the distal end part at a same height and is connected to the distal end part.

12. The parallel type integrated actuator of claim 1, wherein each link is composed of a first link section and a second link section, in which a rear-end part of the first link section is respectively and rotatably coupled to each shaft, a rear-end part of the second link section is rotatably connected to the front-end part of the first link section, and the front-end part of the second link section is rotatably connected to the distal end part.

13. The parallel type integrated actuator of claim 12, wherein the first link section is bent and extended in an oblique direction to the outside in a state where each rear-end part of the first link section is respectively connected to each shaft, and the second link section is connected to the distal end part by being bent inwardly toward the distal end part once more after being extended to the side once in a state where the rear-end part of the second link section is connected to the front-end part of the first link section.

14. The parallel type integrated actuator of claim 1, wherein any one of the first rotor, the second rotor, and the third rotor is fixed, and the remaining rotors are rotated so that the distal end part performs the pitching motion.

15. The parallel type integrated actuator of claim 1, wherein the first rotor, the second rotor, and the third rotor are rotated in the same magnitude and direction by the distal end part to perform a rolling motion.

16. The parallel type integrated actuator of claim 1, wherein the universal link part has a form in which the center thereof is passed through by the distal end part, and is provided with a joint part relatively and rotatably coupled to the distal end part, one side thereof being connected to the fourth rotor and rotated with the fourth rotor, and the other side thereof being composed of a connection part connected to the joint part so as to be relatively rotatable.

17. The parallel type integrated actuator of claim 16, wherein the joint part is rotated relative to the distal end part about a longitudinal axis of the distal end part, and is relatively rotated with the connection part about an axis perpendicular to the longitudinal axis of the distal end part.

18. The parallel type integrated actuator of claim 17, wherein the connection part has a ring shape surrounding the outside of the joint part, and includes a ring part connected to rotate relative to the joint part about an axis perpendicular to the longitudinal axis of the distal end part and a transmission part connecting the ring part and the fourth rotor to each other to be relatively rotated with the ring part about an axis perpendicular to an axis connecting the joint part and the ring part to each other.

19. The parallel type integrated actuator of claim 16, wherein the first rotor, the second rotor, the third rotor, and the fourth rotor are rotated in the same magnitude and direction so that the distal end part performs a yawing motion.

20. The parallel type integrated actuator of claim 16, wherein the first rotor, the second rotor, and the third rotor are fixed so that the distal end part is not rotated, whereas the fourth rotor is rotated, whereby the joint part rotates relative to the distal end part.

21. The parallel type integrated actuator of claim 16, wherein the connection part extends from the outside of each link part to the joint part side and is connected to the joint part.

* * * * *